(12) United States Patent
Oelckers et al.

(10) Patent No.: US 7,505,201 B2
(45) Date of Patent: Mar. 17, 2009

(54) METHOD FOR OPTIMIZED SETTING OF LIGHT POWER AT THE OBJECT PLANE IN THE CASE OF REFLECTED LIGHT MICROSCOPES

(75) Inventors: Stefan Oelckers, Berlin (DE); Peter Schalt, Moorrege (DE)

(73) Assignee: Möller-Wedel GmbH, Wedel (DE)

( * ) Notice: Subject to any disclaimer, the term of this patent is extended or adjusted under 35 U.S.C. 154(b) by 162 days.

(21) Appl. No.: 11/251,070

(22) Filed: Oct. 14, 2005

(65) Prior Publication Data

US 2006/0087729 A1 Apr. 27, 2006

(30) Foreign Application Priority Data

Oct. 14, 2004 (DE) .................. 10 2004 050 096
Mar. 10, 2005 (DE) .................. 10 2005 011 121

(51) Int. Cl.
*G02B 21/06* (2006.01)

(52) U.S. Cl. ...................... 359/385; 359/368
(58) Field of Classification Search ............... 359/388, 359/385, 368; 250/201.1, 205, 221
See application file for complete search history.

(56) References Cited

U.S. PATENT DOCUMENTS

| 4,768,020 | A | * | 8/1988 | Chen | 340/567 |
| 5,073,838 | A | * | 12/1991 | Ames | 361/103 |
| 2001/0024321 | A1 | * | 9/2001 | Ruehl et al. | 359/385 |

* cited by examiner

*Primary Examiner*—Joshua L Pritchett
(74) *Attorney, Agent, or Firm*—Merchant & Gould P.C.

(57) ABSTRACT

The invention relates to a method for optimized setting of light power at the object plane in the case of reflected light microscopes, surgical microscopes in particular. In accordance with the invention, a check is performed as to whether or to what extent thermal danger or damage to the illuminated sections is relevant in order to regulate, in particular limit, the light output of a light source upon a threshold being reached.

20 Claims, No Drawings

METHOD FOR OPTIMIZED SETTING OF LIGHT POWER AT THE OBJECT PLANE IN THE CASE OF REFLECTED LIGHT MICROSCOPES

The invention relates to a method for the optimized setting of the light power level at the object plane in the case of reflected light microscopes, surgical microscopes in particular.

The primary task of the illumination systems of known surgical microscopes is to provide sufficient illumination in an operating surgeon's visual field. There are a number of other aspects above and beyond this main requirement, some only relevant to specific applications.

In the case of the VM 900 surgical microscope from the HS Möller-Wedel International company, a module for coaxial cold light illumination receives light from the source of illumination in the microscope arm through a fiber optic cable. The size of the light spot in the object plane changes as the microscope's zoom setting is adjusted. When viewed through the eyepiece, the image should always appear at unvarying brightness. Yet the light spot is always larger than the visual field. Depending upon how the front lens is configured, the visual field is in the range of e.g. between 54.7 mm and 9.1 mm and the respective illuminated field hereto within a range of from 68 mm to 35 mm. Thus, while the illuminated field can be reduced based on the given illumination zoom, it cannot fall below a preset minimum diameter.

In the case of Möller's Hi-R 1000 surgical microscope, the diameter of the illuminated field likewise changes upon adjustments to the microscope's degree of magnification. At high magnifications, the diameter of the illuminated field is in principle much larger than actually necessary. A further reducing of the illuminated field can be made by means of the so-called spot illuminator, by introducing manually-operated diaphragms into the path of illumination. The Möller Hi-R 1000 surgical microscope is additionally provided with a UV and an IR filter for the protection of the patient and the operator. Since, given constant illumination intensity, brightness at the eyepiece decreases at increasing magnification, it is of advantage to increase the intensity of illumination with increasing magnification. In the prior art, this is done at a constant light source output with a so-called illumination zoom, as the size of the illuminated spot is adapted to the visual field decreasing with increasing magnification so as to increase illumination intensity in the visual field area. What this ultimately achieves is that the brightness at the eyepiece remains very much the same for the user above a certain zoom range as with the above-cited types of microscopes. This procedure is automatic in the VM 900 Möller-Wedel microscope without the user needing to do anything.

In order to increase the depth of focus, some devices allow for introducing diaphragms into the viewing path. Doing so inevitably reduces the brightness at the eyepiece, which the user can in turn readjust by manually increasing the lamp's light output by a certain measure.

In most working situations, the size of the illuminated spot should be slightly larger than the visual field. Light beyond the visual field is optically of no value and reduces the contrast where applicable. In certain situations, it is of further advantage to further reduce the size of the illuminated area in order to e.g. minimize reflections on certain surgical instruments. As mentioned, the Hi-R 1000 type of microscope allows manual diaphragm control for this purpose.

There is a fundamental difference between changing the size of the illuminated spot with an illumination zoom versus with diaphragms. Closing an aperture down does not change the intensity in the remaining area of the illuminated spot; however, reducing the illuminated spot with illumination zoom increases the intensity in the remaining area of the illuminated spot since the original initial light output is concentrated in continually smaller areas. Depending upon which fiber optic guides and optics are used, as well as the distance from which the user will work, the illuminated magnification to the illuminated spot cannot fall below a certain degree and any further reduction can only be realized, as with the above-described types of microscopes, by means of diaphragms.

Potential light damage, in particular photochemical light damage, resulting from surgical microscope illumination being too intense are known in the field of ophthalmology. Thus, this discipline virtually shuns particularly bright xenon light sources with additionally relatively high color temperature.

In eye surgeries, photochemical damage is in particular counteracted by illuminating means having lower color temperatures and by optical filters which in particular decrease the level of light to below 500 nm. In all other disciplines in which surgical microscopes are used, for example neurosurgery, ear-nose-throat surgeries and others, no photochemical damages are to be expected, whereby ever since the emergence of surgical microscopes, it is has been surmised that neither direct nor indirect thermal damages are induced by microscope light.

The present state of the art and the developments being made as relate to light sources have enabled smaller fiber optic diameters. This thus allows light sources to yield smaller light spots at an unchanged level of light output based on the illumination magnification and thus realize higher intensities for smaller light spots at greater magnification, again with unchanged light output at the light source.

This is primarily of advantage when viewing inanimate objects through a micro-scope. However, in the case of surgical microscopes, simple advances in device engineering allowing for the use of smaller fiber optic diameters and the enlarged zoom area to the illumination magnification resulting therefrom gives rise to the danger of thermal tissue damage which, given moderate heating over a longer period of time, has the potential to lead to tissue damage by desiccation. In cases of greater heating, there is the added danger of non-reversible tissue damage occurring within a shorter period of time.

Apart from the microscopes used in ophthalmology, no mechanisms applicable to minimizing the potential danger of thermal tissue damage have been realized to date beyond the option for a surgeon to manual decrease the lamp's intensity. Since with the exception of the ophthalmology discipline, it is not the photochemical but rather the thermal effects which are of greatest concern, the concepts established in ophthalmic technology are neither applicable nor relevant to other fields.

To summarize, a substantial disadvantage to today's surgical microscopes is that the brightness of the light source and the use of any given diaphragms to limit the illuminated spot can only be set manually by a user, whereby the improper doing of so can result in the cited patient-critical thermal effects.

With the afore-mentioned in mind, it is thus the task of the present invention to provide an advanced method for optimally setting the light power level at the object plane of reflected light microscopes, surgical microscopes in particular, which can prevent negative thermal effects when using the microscope to view or examine tissues or similar objects, whereby undesired stray light is additionally minimized and contrast is improved.

The invention solves this task with a method as defined according to the teaching of claim 1, with the subclaims representing no less than functional configurations and embodiments.

The fundamental procedural concept behind the invention therefore lies in preventing tissue damage by automatically limiting light output upon prevailing or arising critical device parameters. The light source's light output is moreover regulated in order to provide the user with a constant brightness at the eyepiece independent of the settings for the other device parameters. Optimized adjusting of the illuminated area to the size of the visual field at optimized conditions of illumination also ensues automatically in accordance with the invention.

In realizing the above-cited optimum setting, an evaluation is made of the device's parameters of illumination magnification, working distance and the settings to any applicable diaphragm for increasing the depth of field and these are then drawn on in setting the illumination zoom and any given illumination diaphragms as well as initial light source output.

In the case of devices having light sources or illuminating means which do not exhibit any appreciable age-contingent changes in performance in the object plane during their service or operating life, light intensity can be set for their entire operating life using constant algorithms and parameters. For devices in which this is not the case, the invention allows for either measuring the actual light intensity or using a correcting function which takes the age-contingent change in light intensity into account, e.g. using a correction value table. Adjustments to the given value of light intensity in each respective case can be made, for example, based on variable attenuation elements in the light source or the microscope or by varying the electrical control via its operating voltage/current settings.

In summary, the method for optimally setting the light output at the object plane of reflected light microscopes, surgical microscopes in particular, automatically adjusts the illuminated area to the respective size of the visual field taking into account and evaluating the microscope's existing device parameters, resulting in default values being determined hereto for the illumination magnification setting as well as at least one variable diaphragm. A check is furthermore made as to whether or to what extent any thermal risk or damage is relevant as far as the illuminated section of the plane in order to set and in particular limit a threshold for the output of the light source. In consequence of the above-described measures, in concrete application of the microscope, e.g. in neurosurgery, thermal damage to tissue can be excluded.

Taken into consideration as microscope device parameters for the automatic adjustment are the illumination zoom setting, the respective working distance and/or the current magnification factor.

A diaphragm to change depth of field can additionally be evaluated as a further microscope device parameter for the above-cited setting adjustment.

In principle, the light intensity at the object plane is limited to a predefined value. This limit value default follows as a function of the size of the light spot.

When the default limit value is exceeded, the size of the illuminated area is reduced.

The limit value default for the light intensity can follow as a function of the reflection properties to the illuminated area.

One embodiment of the invention allows for the possibility of overriding the limiting of light intensity briefly or on a time-controlled automatic basis. Said limiting can be manually overridden by the user, whereby a visual and/or acoustic alarm signal is generated in this case. Said alarm can be triggered automatically after a pre-defined interval of time.

Upon manually overriding the limitation of intensity, the invention allows for the possibility of reversing this overriding after a predefined interval of time has passed.

At lower factors of magnification, the size of the illuminated spot is primarily influenced by the illumination magnification setting and at higher magnifications, secondarily by the variable diaphragm.

The invention claimed is:

1. Method for optimized setting of light power at the object plane for reflected light microscopes in use, comprising:
   Automatically limiting light intensity at the illuminated area in consideration of illumination zoom setting and/or a respective working distance;
   Performing a check as to whether or to what extent thermal danger or damage to the illuminated sections is relevant to limit the light output of a light source without shutting off said light source upon a threshold being reached.

2. Method in accordance with claim 1, wherein the limit value default follows as a function of the size of the light spot.

3. Method in accordance with claim 2, wherein the size of the illuminated area remains and is reduced upon the default limit value being exceeded.

4. Method in accordance with claim 1, wherein the limit value default follows as a function of the reflection properties of an object being illuminated in the illuminated area.

5. Method in accordance with claim 1, wherein the limiting of light intensity can be overridden for a period of time or on an automatic time-controlled basis.

6. Method in accordance with claim 5, wherein when the limitation of intensity has been manually overridden, the limitation is re-established after a predefined interval of time has passed.

7. Method in accordance with claim 1, wherein the limiting of light intensity can be manually overridden by a user, wherein a visual and/or acoustic alarm signal will be generated in such a case.

8. Method in accordance with claim 7, wherein the alarm signal or warning is triggered or generated after a predefined interval of time.

9. Method in accordance with claim 1, wherein age-contingent diminishing of light source output is taken into consideration.

10. Method in accordance with claim 9, wherein measurement techniques are used to determine the light source output.

11. Method in accordance with claim 9, wherein the expected age-contingent diminishing of light output is determined using a device-specific correcting function or correction table.

12. Method in accordance with claim 1, wherein the regulating of the light source light output ensues with attenuators and/or by changing the electrical control for the light source.

13. Method in accordance with claim 1, wherein the illuminated area is in principle limited to the size necessary relative the visual field.

14. Method in accordance with claim 1, wherein the light intensity is set at the object plane at least with respect to a certain range of device parameters, including working distance, magnification factor, diaphragm setting for depth of field or illumination zoom, wherein the light source remains on and the user perceives a constant brightness at the eyepiece, also in the special case of a light spot which does not fill the visual field or which is not homogeneous in its intensity.

15. A method for controlling an intensity of light at an object plane of a reflected light microscope having a light source and an associated optical path for providing said light, the method comprising:
- estimating said light intensity at said object plane based on one or more parameters of said light source and/or said optical path;
- assessing whether said estimated light intensity exceeds a threshold light intensity at which thermal damage may occur to in vivo tissue located at said object plane; and
- reducing said light intensity at said object plane without shutting off said light source if said estimated light intensity exceeds said threshold light intensity.

16. The method of claim 15, wherein said one or more parameters include at least one parameter selected from the group consisting of: an illumination zoom setting, a working distance, a spot size at said object plane, magnification, a diaphragm setting, an initial light source output, and an age-contingent light intensity correction value associated with said light source.

17. A method for controlling an intensity of light at an object plane of a reflected light microscope having a light source and an associated optical path for providing said light, the method comprising:
- quantifying said light intensity at said object;
- assessing whether said quantified light intensity exceeds a threshold light intensity at which thermal damage may occur to in vivo tissue located at said object plane; and
- reducing said light intensity at said object plane without shutting off said light source if said quantified light intensity exceeds said threshold light intensity.

18. A reflected light microscope, comprising:
- an optical path;
- a light source associated with said optical path for providing light at an object plane of said microscope;
- light intensity estimating means for estimating an intensity of said light at said object plane based on illumination zoom setting and/or a respective working distance;
- assessing means for assessing whether said estimated light intensity exceeds a threshold light intensity at which thermal damage may occur to in vivo tissue located at said object plane; and
- light intensity reducing means for reducing said light intensity at said object plane without shutting off said light source if said estimated light intensity exceeds said threshold light intensity.

19. The reflected light microscope of claim 18, comprising:
- a correction value table storing age-contingent light intensity correction values associated with said light source; wherein said light intensity estimating means estimate said light intensity as said object plane based on at least one of said age-contingent light intensity correction values.

20. A reflected light microscope, comprising:
- an optical path;
- a light source associated with said optical path for providing light at an object plane of said microscope;
- quantifying means for quantifying an intensity of said light at said object plane based on one or more parameters of said light source and/or said optical path;
- assessing means for assessing whether said quantified light intensity exceeds a threshold light intensity at which thermal damage may occur to in vivo tissue located at said object plane; and
- light intensity reducing means for reducing said light intensity at said object plane without shutting off said light source if said quantified light intensity exceeds said threshold light intensity.

* * * * *